(12) United States Patent
Shimada et al.

(10) Patent No.: US 7,192,383 B2
(45) Date of Patent: Mar. 20, 2007

(54) CONTROL APPARATUS AND METHOD FOR AUTOMOTIVE VEHICLE IN WHICH A BELT-TYPE CONTINUOUSLY VARIABLE TRANSMISSION IS EQUIPPED WITH A BELT SLIP PREVENTIVE FEATURE

(75) Inventors: Tetsuya Shimada, Saitama (JP); Masahiro Iriyama, Yokohama (JP); Kenichi Gotou, Kanagawa (JP); Masahiro Yamamoto, Kanagawa (JP); Yoshihisa Kodama, Yokohama (JP); Shigeki Shimanaka, Kanagawa (JP); Hiroyasu Tanaka, Kanagawa (JP); Takuichiro Inoue, Kanagawa (JP); Tatsuo Wakahara, Kawasaki (JP); Hisao Nobu, Kanagawa (JP)

(73) Assignees: Jatco Ltd, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/669,711

(22) Filed: Sep. 25, 2003

(65) Prior Publication Data
US 2004/0063537 A1 Apr. 1, 2004

(30) Foreign Application Priority Data
Sep. 26, 2002 (JP) ............................. 2002-280749

(51) Int. Cl.
*F16H 61/662* (2006.01)
(52) U.S. Cl. ............................. 477/45; 477/46; 477/48; 477/49; 477/110; 477/111
(58) Field of Classification Search ................ 477/44, 477/45, 46, 48, 49, 107, 110, 111
See application file for complete search history.

(56) References Cited

U.S. PATENT DOCUMENTS

| | | | | | |
|---|---|---|---|---|---|
| 5,199,399 | A | * | 4/1993 | Shibuya | 477/111 |
| 5,310,384 | A | * | 5/1994 | Siemon | 474/70 |
| 5,720,692 | A | * | 2/1998 | Kashiwabara | 477/45 |
| 6,459,978 | B2 | | 10/2002 | Taniguchi et al. | |
| 6,530,860 | B2 | * | 3/2003 | Ui | 477/45 |
| 6,757,603 | B2 | * | 6/2004 | Nozaki | 701/51 |
| 2001/0049316 | A1 | | 12/2001 | Yamamoto et al. | |

FOREIGN PATENT DOCUMENTS

| | | |
|---|---|---|
| JP | 3-181662 A | 8/1991 |
| JP | 6-11022 A | 1/1994 |
| JP | 9-250370 A | 9/1997 |
| JP | 2001-47880 A | 2/2001 |
| JP | 2001-330119 A | 11/2001 |
| JP | 2001-330145 A | 11/2001 |

* cited by examiner

*Primary Examiner*—David D. Le
(74) *Attorney, Agent, or Firm*—Foley & Lardner LLP

(57) ABSTRACT

In control apparatus and method for an automotive vehicle, the vehicle having a continuously variable transmission associated with a vehicular engine and including a belt that transmits a revolution of a primary pulley to a secondary pulley that is enabled to make a gear shift by modifying a pulley ratio between the primary and secondary pulleys with a hydraulic, a determination is made as to whether a belt slip between at least one of the primary and the secondary pulleys occurs and an output section outputs a signal to command an engine control unit to increase an engine speed by a predetermined engine speed when the belt slip is determined to occur.

10 Claims, 6 Drawing Sheets

CONTROL APPARATUS AND METHOD FOR AUTOMOTIVE VEHICLE IN WHICH A BELT-TYPE CONTINUOUSLY VARIABLE TRANSMISSION IS EQUIPPED WITH A BELT SLIP PREVENTIVE FEATURE

BACKGROUND OF THE INVENTION

1. Field of the Invention

The present invention relates to shift hydraulic system of a belt-type continuously variable transmission. More particularly, the present invention relates to control apparatus and method for preventing an occurrence of a belt slip of the belt-type continuously variable transmission (so called, CVT).

2. Description of the Related Art

A Japanese Patent Application First Publication No. Heisei 9-250370 published on Sep. 22, 1997 exemplifies a previously proposed shift hydraulic system for a belt-type continuously variable transmission. In the above-described Japanese Patent Application First Publication, when an electromagnetic hydraulic control valve has failed to control a line pressure, a technique to prevent an excessive rise in the line pressure is disclosed. That is to say, if the electromagnetic hydraulic control valve has failed, the hydraulic valve becomes an open state such that the hydraulic of an oil pump is disabled to be drained and an excessive rise in the line pressure causes a clamp pressure to clamp a belt of the continuously variable transmission to be excessively high. Hence, the frictional load of the belt becomes large, a fuel consumption becomes wasteful, and a durability of the belt becomes worsened.

SUMMARY OF THE INVENTION

However, if a (waste or dust) is invaded into a hydraulic circuit disclosed in the above-described Japanese Patent Application Publication, the valve constituting the electromagnetic hydraulic control valve becomes sticky due to a clogging of the waste or dust so that the line pressure becomes lowered. If the line pressure is lowered, the clamp pressure for the belt is not sufficiently supplied. Thus, a slip of the belt occurs. The durability of the belt becomes reduced. Especially, when the vehicle is started, the large torque is inputted. On the contrary, there is a possibility that the belt slips when an engine speed is slow and the line pressure becomes lowered.

It is, therefore, an object of the present invention to provide control apparatus and method for the belt continuously variable transmission associated with an engine which are capable of preventing the occurrence of the belt slip and improving the durability of the belt even if the waste or dust is invaded into the hydraulic circuit to reduce the line pressure.

According to one aspect of the present invention, there is provided a control apparatus for an automotive vehicle, comprising: a continuously variable transmission associated with a vehicular engine and including a belt that transmits a revolution of a primary pulley to a secondary pulley that is enabled to make a gear shift by modifying a pulley ratio between the primary and secondary pulleys with a hydraulic; a belt slip determining section that determines if a slip between at least one of the primary and the secondary pulleys occurs; and an output section that outputs a signal to command an engine control unit to increase an engine speed by a predetermined engine speed when the belt slip determining section determines that the slip therebetween occurs.

According to another aspect of the present invention, there is provided a control apparatus for an automotive vehicle, comprising: an engine control unit; an oil pump driven by an engine; a continuously variable transmission associated with a vehicular engine and including a belt that transmits a revolution of a primary pulley to a secondary pulley that is enabled to make a gear shift by modifying a pulley ratio between the primary and secondary pulleys with a hydraulic, continuously variable transmission including a belt to transmit a revolution of a primary pulley to a secondary pulley driven by a revolution of the engine; an original hydraulic supplying section that supplies an original hydraulic of a control hydraulic to control the pulley ratio with the oil pump as a hydraulic source; a gear shift actuator that supplies an original hydraulic for the control hydraulic that controls a pulley ratio with the oil pump as a hydraulic source; a gear shift actuator that supplies the control hydraulic to each pulley; and a gear shift controlling section that outputs a control command to the gear shift actuator; and an original hydraulic determining section that determines whether the original hydraulic of the original hydraulic supplying section is equal to or below a predetermined hydraulic when an engine idling is carried out during a vehicular stop; and an output section that outputs a signal to command the engine control unit to increase the engine idling speed by a predetermined engine speed.

According to a still another aspect of the present invention, there is provided a control method for an automotive vehicle, the vehicle comprising: a continuously variable transmission associated with a vehicular engine and including a belt that transmits a revolution of a primary pulley to a secondary pulley that is enabled to make a gear shift by modifying a pulley ratio between the primary and secondary pulleys with a hydraulic, and the method comprising: a belt slip determining section that determines if a belt slip between at least one of the primary and the secondary pulleys occurs; and outputting a signal to command an engine control unit to increase an engine speed by a predetermined engine speed at a time of determining that the slip therebetween occurs.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

(First Embodiment)

Figure 1:
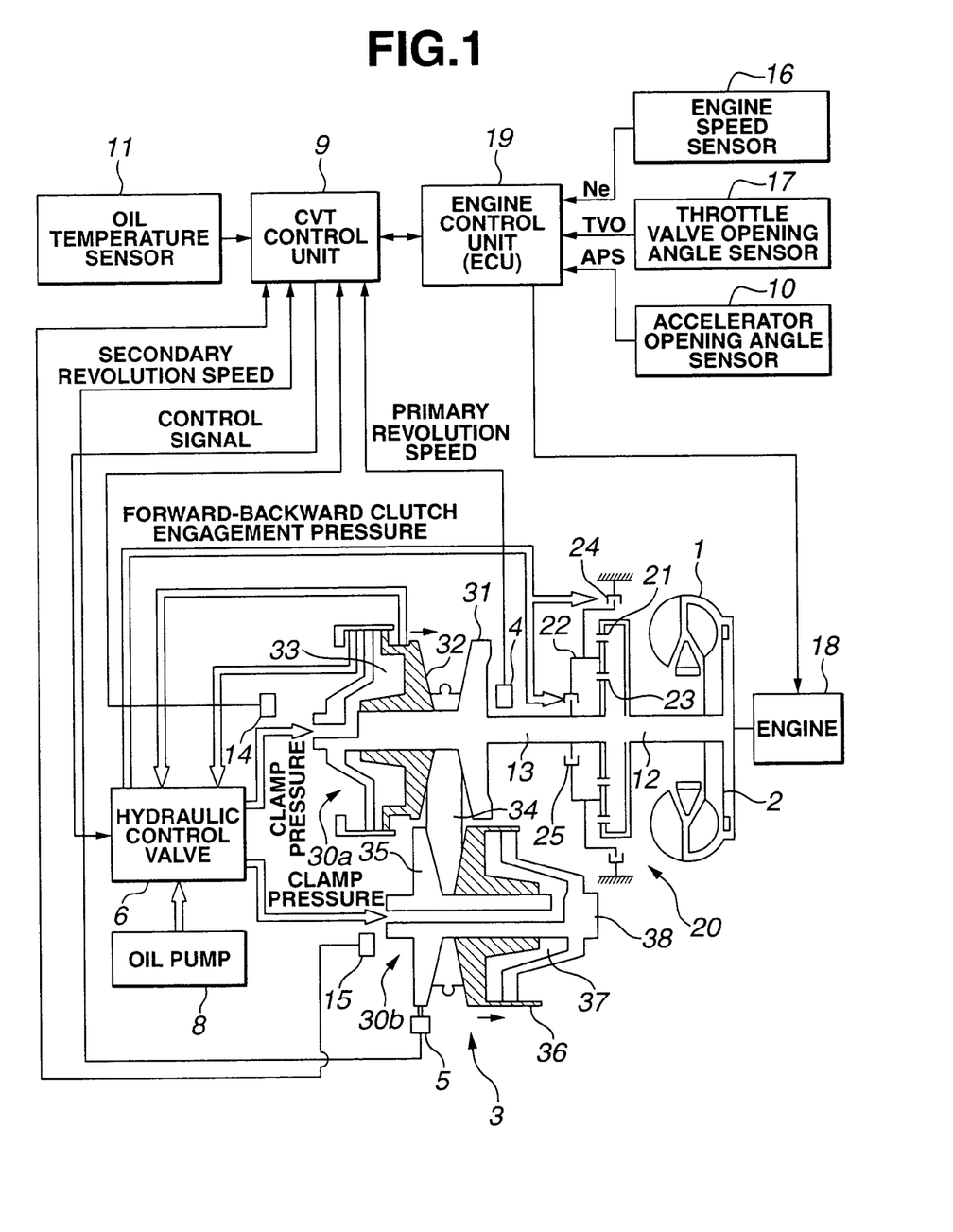
FIG. 1 is a circuit block diagram of an essential unit of a vehicle equipped with a belt continuously variable transmission to which a control apparatus for the belt continuously variable transmission is applicable.

FIG. 1 shows a control system of an engine and a belt(-type) continuously variable transmission 3 (hereinafter, described as CVT) to which a first preferred embodiment of a control apparatus according to the present invention is applicable.

Reference numeral 1 denotes a torque converter, reference numeral 2 denotes a lock-up clutch, reference numeral 3 denotes a CVT (Continuously Variable Transmission), reference numeral 4 denotes a primary pulley revolution speed sensor, reference numeral 5 denotes a secondary pulley revolution speed sensor, reference numeral 6 denotes a hydraulic control valve unit, reference numeral 8 denotes an oil pump driven with an engine, reference numeral 9 denotes a CVT control unit, reference numeral 10 denotes an accelerator opening angle sensor, reference numeral 11 denotes an oil temperature sensor, reference numeral 18 denotes an engine, reference numeral 19 denotes an engine control unit (hereinafter, also abbreviated as ECU), reference numeral 16 denotes an engine speed sensor, and a reference numeral 17 denotes a throttle valve opening angle sensor. Engine 18 is provided with a plurality of fuel injectors to inject fuel and with an electronically controlled throttle valve which is operated in response to a command of an electronically driven actuator. ECU 19 outputs a command to inject fuel to each fuel injector and a command to open an angle to electronically controlled throttle valve.

ECU 19 basically receives signals from engine speed sensor 16 detecting the engine speed Ne, from accelerator opening angle sensor 10 to detect a manipulated variable of an accelerator pedal by a vehicle driver, and from throttle opening angle sensor 17 to detect a throttle opening angle TVO corresponding to an engine load and outputs commands such as to command engine 18 to control an engine output torque, to command engine 18 to control an idling speed of engine 18 during a vehicle stop, and to command engine 18 to control a fuel cut-off to improve a fuel economy by cutting off the fuel injection until an engine speed Ne is reduced to a predetermined engine speed during a vehicular deceleration. Torque converter 1 is linked to an engine output axle as a revolution transmission mechanism and lock-up clutch 2 is disposed to directly couple engine 18 to CVT 3. An output end of torque converter 1 is linked to a ring gear 21 of forward-and-rearward switching mechanism 20. Forward-and-rearward switching mechanism 20 is constituted by a planetary gear mechanism having a ring gear 21 linked to an engine output axle 12, a pinion carrier 22, and a sun gear 23 linked to an input axle 13 of the transmission. Pinion carrier 22 is provided with a backward drive brake 24 to fix pinion carrier 22 to a transmission casing and a forward drive clutch 25 to integrally link input axle 13 of the transmission and the pinion carrier 22.

Primary pulley 30a of CVT 3 is disposed on an end of transmission input axle 13. CVT 3 is constituted by primary pulley 30a, secondary pulley 30b, and a belt 34 which transmits a revolution force of primary pulley 30a to a secondary pulley 30b. Primary pulley 30a includes a fixed truncated cone shaped plate 31, and a movable truncated cone shaped plate 32 which is movable in an axial direction of the input axle 13 of transmission by means of a hydraulic acted upon a primary pulley cylinder chamber 33, a letter V-shaped pulley groove being formed together with an oppositely arranged fixed truncated cone shaped plate 31.

A secondary pulley 30b is disposed on a driven axle 38. Secondary pulley 30b includes a fixed truncated cone shaped plate 35 integrally revolved to driven axle 38 and a movable truncated cone shaped plate 36 which is formed with a letter V-shaped pulley groove together with the opposing fixed truncated cone plate 35 is movable in the axial direction of driven axle 38 by means of the hydraulic acted upon a secondary pulley cylinder chamber 37.

A drive gear (not shown) is fixed onto driven axle 38 and drive gear drives a drive shaft from pinion disposed on an idler axle, a final gear, and differential mechanism to the road wheels (not shown).

The revolving force inputted from engine output axle 12 to CVT 3 is transmitted to CVT 3 via torque converter 1 and forward-and-rearward switching mechanism 20. The revolving force of transmission input axle 13 is transmitted to a differential gear unit via primary pulley 30a, belt 34, secondary pulley 30b, a driven axle 38, drive gear, an idler gear, an idler axle, a pinion, and a final gear.

During a power transmission as described above, a contact position radius of belt 34 is varied by displacing the contact position radius by moving movable truncated cone plate 36 in the axial direction and the movable truncated cone plate 32 of primary pulley 30a in the axial direction. Thus, a revolution ratio, viz., a gear ratio between primary pulley 30a and secondary pulley 30b can be changed. Such a control as a V-shaped pulley groove width described above is carried out by means of the hydraulic control via CVT control unit 9 to be supplied to primary pulley cylinder chamber 33 or secondary pulley cylinder chamber 37.

CVT control unit 9 receives primary revolution speed Npri from primary pulley revolution speed sensor 4, a secondary pulley revolution speed $N_{SEC}$ from secondary pulley revolution speed sensor 5, a primary pulley pressure Ppri from primary pressure sensor 14, and a secondary pulley Psec from secondary pressure sensor 15. In addition, CVT control unit 9 is communicated with ECU 19 to transmit and receive each sensor value information therebetween. Based on these input signals control signals are calculated. Control signals are outputted to hydraulic control valve unit 6.

Hydraulic control valve unit 6 drives respective electronic control valves and stepping motor 54 as will be described later on the basis of the control signals calculated in CVT control unit 9. The shift control is carried out by supplying a control pressure to primary pulley cylinder chamber 33 and secondary pulley cylinder chamber 37.

Figure 2:
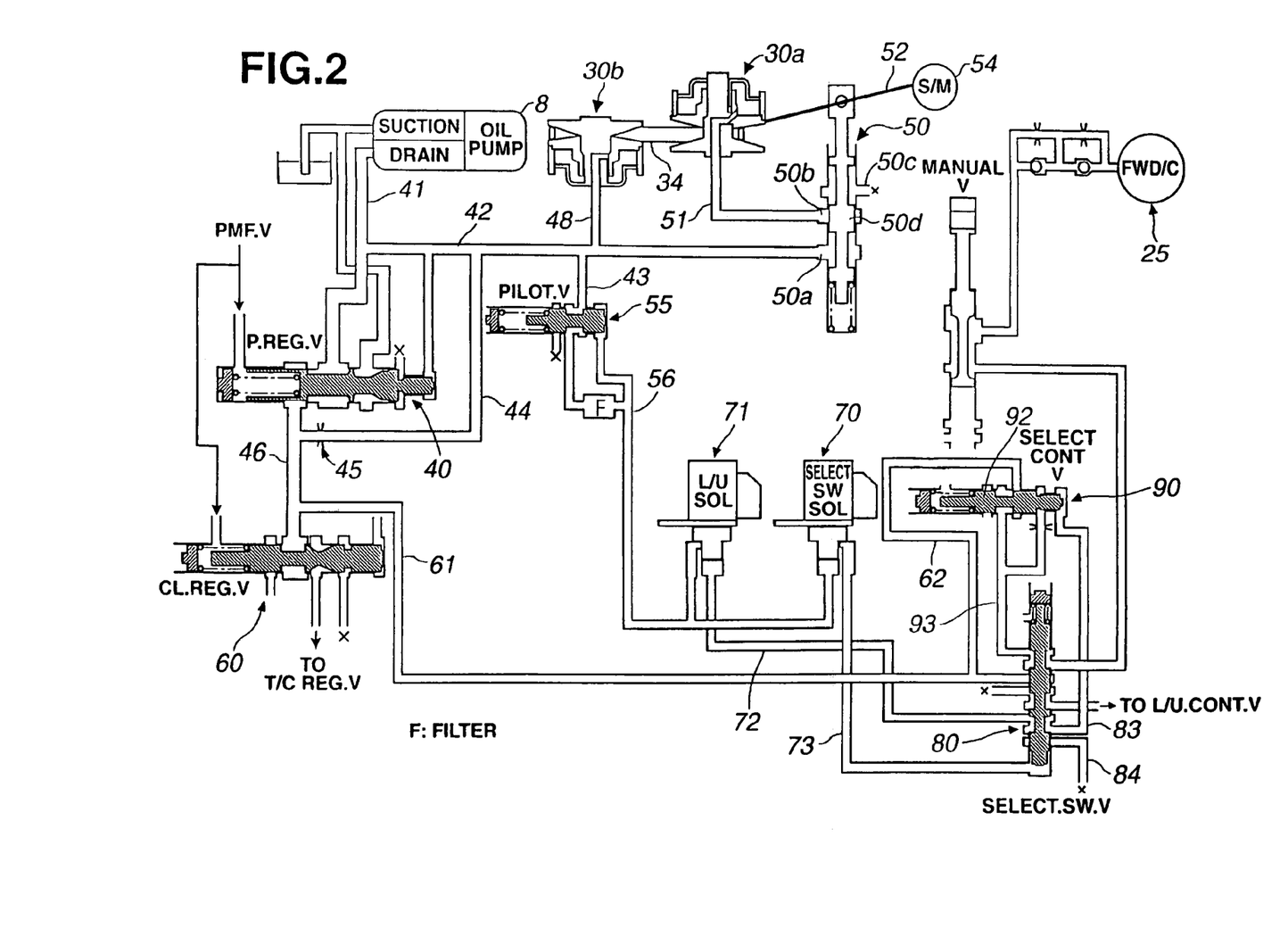
FIG. 2 is a hydraulic circuit block diagram of the control apparatus shown in FIG. 1.

FIG. 2 shows a circuit block diagram representing the hydraulic circuit of the belt (type) continuously variable transmission in the first embodiment according to the present invention.

In FIG. 2, reference numeral 40 denotes a pressure regulator valve to adjust a delivery pressure of an oil pump 8 supplied from an oil passage 41 as a line pressure (viz., a pulley clamp pressure). An oil passage 42 is communicated with an oil passage 41. Oil passage 42 is connected to a shift control valve 50 which supplied a control hydraulic to primary pulley cylinder chamber 33 of CVT 3. A pulley pressure supply oil passage 48 which supplies a clamp pressure to clamp belt 34 is connected to secondary pulley cylinder. In addition, oil passage 43 connected to oil passage 42 supplies an original pressure of a pilot valve 55. Shift control valve 50 includes a suction port 50a connected to oil passage 42, a supply port 50b (which supplies the hydraulic from primary pulley cylinder 33 via an oil passage 51), a drain port 50c which drains the hydraulic, and a link 52 to which a stepping motor (S/M) 54, which is operated in response to a control signal from CVT control unit 9, is connected. Shift control valve 50 constitutes a mechanical feedback mechanism. An activation of stepping motor 54 moves spool 50d. When the hydraulic is supplied to primary pulley cylinder chamber 33, a variation in a gear (shift) ratio causes movable pulley (secondary pulley) to be moved. This movement drives spool 50d in a direction opposite to the drive of stepping motor 54 so that the supply of hydraulic is stopped. Thus, a desired gear (shift) ratio can be achieved. On the other hand, when the hydraulic of primary pulley cylinder chamber 33 is drained (exhausted), the variation in the gear ratio causes the movable pulley to be moved. This movement drives spool 50d in the opposite direction to the previous drive so that the drainage of the hydraulic is stopped. Thus, the desired gear ratio can be achieved.

Hydraulic drained from pressure regulator valve 40 is supplied to a clutch regulator valve 60 via an oil passage 46. As describe below, a clutch regulator valve 60 adjusts the hydraulic lower than that developed by pressure regulator valve 40 so that the hydraulic supplied as a clutch pressure of the forward clutch 25 is not higher than a pulley clamp pressure. This oil passage 46 is communicated with oil passage 42 via an oil passage 44, which includes an orifice 45. Clutch regulator valve 60 adjusts the hydraulic in oil passage 46 and oil passage 61. The hydraulic of oil passage 61 is supplied to a select switching valve 80 and select control valve 90.

Pilot valve 55 sets a constant supply pressure to a lock-up solenoid 71 via an oil passage 56, to a select switching solenoid 70. An output pressure of select switching solenoid 70 is supplied from oil passage 73 to select switching valve 80 to control an operation of a select switching valve 80. An output pressure of lock-up solenoid 71 is supplied from oil passage 72 to select switching valve 80.

Select switching valve 80 is operated by select switching solenoid 70. An oil passage 72 which supplies a signal pressure from lock-up solenoid 71 is connected as an input port of select switching valve 80, an oil passage 61 at which clutch regulator valve 60 serves to adjust the hydraulic is connected to the select switching valve 80, and an oil passage 93 at which select control valve 90 serves to adjust the hydraulic is connected to select switching valve 80. An oil passage 83 to supply the hydraulic to operate a spool 92 of a select control valve 90 is connected to select switching valve 80. A drain oil passage 84 to drain the hydraulic is connected to select switching valve 80.

Select control valve 90 is operated by means of lock-up solenoid 71 supplied from hydraulic passage 83. A hydraulic passage 62 at which the hydraulic is adjusted by means of clutch regulator valve 60 is connected to an input port of select control valve 90. An oil passage 83 to supply a signal pressure of lock-up solenoid 71 is connected to select control valve 90. Then, a control over a communication state between the oil passage 62 and the oil passage 93 causes the hydraulic to be adjusted.

Figure 3:
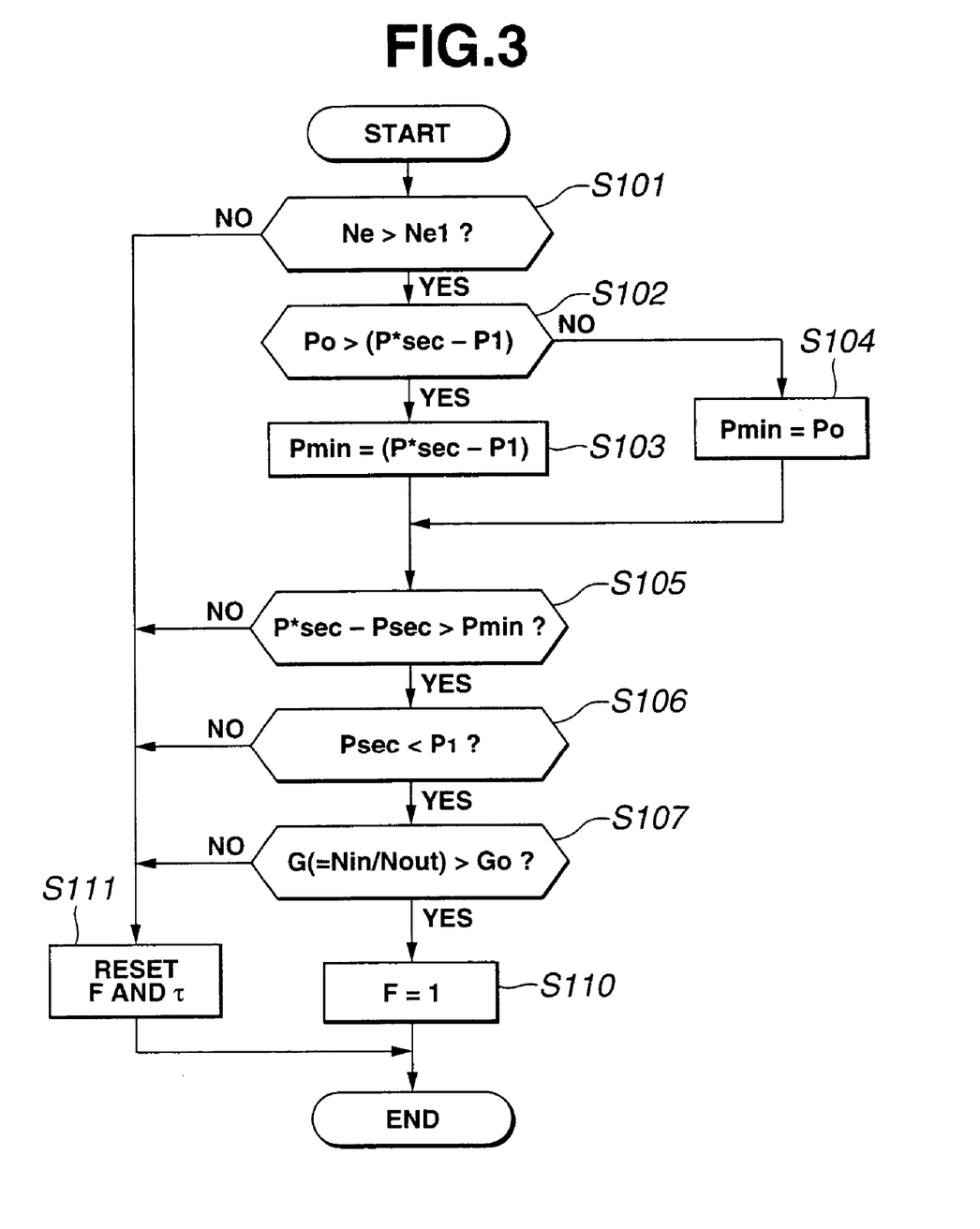
FIG. 3 is an operational flowchart representing a belt slip detection control procedure in the first embodiment of the control apparatus for the belt continuously variable transmission.

FIG. 3 shows an operational flowchart representing a belt slip detection control procedure executed in the first embodiment of the control apparatus.

At a step S101, CVT control unit 9 determines whether engine speed Ne is higher than a predetermined engine speed Ne1. If Ne>Ne1 (Yes) at step S101, the routine goes to a step S102. That is to say, in a case where the hydraulic is not secured irrespective of the drive of the engine, there is a possibility of failure in the hydraulic circuit. At step S102, CVT control unit 9 determines whether a difference ($P^*_{sec}$–$P_1$) between a target secondary pulley cylinder hydraulic P*sec and a first set hydraulic $P_1$ (for example, 0.05 MPa) is larger than a (second) set hydraulic $P_0$ (for example, 1 MPa). If the difference (P*sec–$P_1$) is larger than set hydraulic $P_0$ (Yes), the routine goes to a step S103. If(P*sec–$P_1$)≦$P_1$(No) at step S102, the routine goes to a step S104. At step S103, CVT control unit 9 sets (P*sec–$P_1$) as a set value Pmin. At step S104, CVT control unit 9 sets the set value to Pmin. At step S102 through S104, CVT control unit 9 selects set value Pmin to determine if a difference between a target secondary pulley hydraulic P*sec and an actual secondary pulley hydraulic Psec is too large. If target secondary pulley hydraulic P*sec is low and placed in the vicinity to set hydraulic value $P_0$, there is no possibility that the deviation is in excess of set hydraulic $P_0$. Hence, as a determination criterion, a subtraction of first set value $P_1$ from target secondary pulley hydraulic P*sec is used. When a target secondary pulley P*sec is high, set hydraulic $P_0$ is used as the deviation determination criterion. At a step S105, CVT control unit 9 determines whether a difference between target secondary pulley hydraulic P*sec and actual secondary pulley hydraulic Psec is larger than set value Pmin, CVT control unit 9 can determine that the hydraulic is sufficiently secured. At a step S106, CVT control unit 9 determines if actual secondary pulley hydraulic Psec is smaller than first set hydraulic $P_1$. If Psec <$P_1$ (Yes) at step S106, the routine goes to a step S107. If Psec>$P_1$ (No) at step S106, the routine goes to step S111. At step 5107, CVT control unit 9 determines if shift ratio G (=Npri (or Nin)/Nsec (or Nout) revolution speed of the primary pulley with respect to the secondary pulley) is larger than a predetermined shift ratio $G_0$. If G>$G_0$ (yes) at step S107, the routine goes to a step S110. If G≦$G_0$ (No) at step S107, the routine goes to step S111. That is to say, if the secondary pulley is not almost revolved against the revolution of the primary pulley, CVT control unit 9 can determine that the belt is being slipped. At step S110, a belt slip (occurrence) flag F is set to "1". At step S111, a belt slip (occurrence) flag F is reset.

Figure 4:
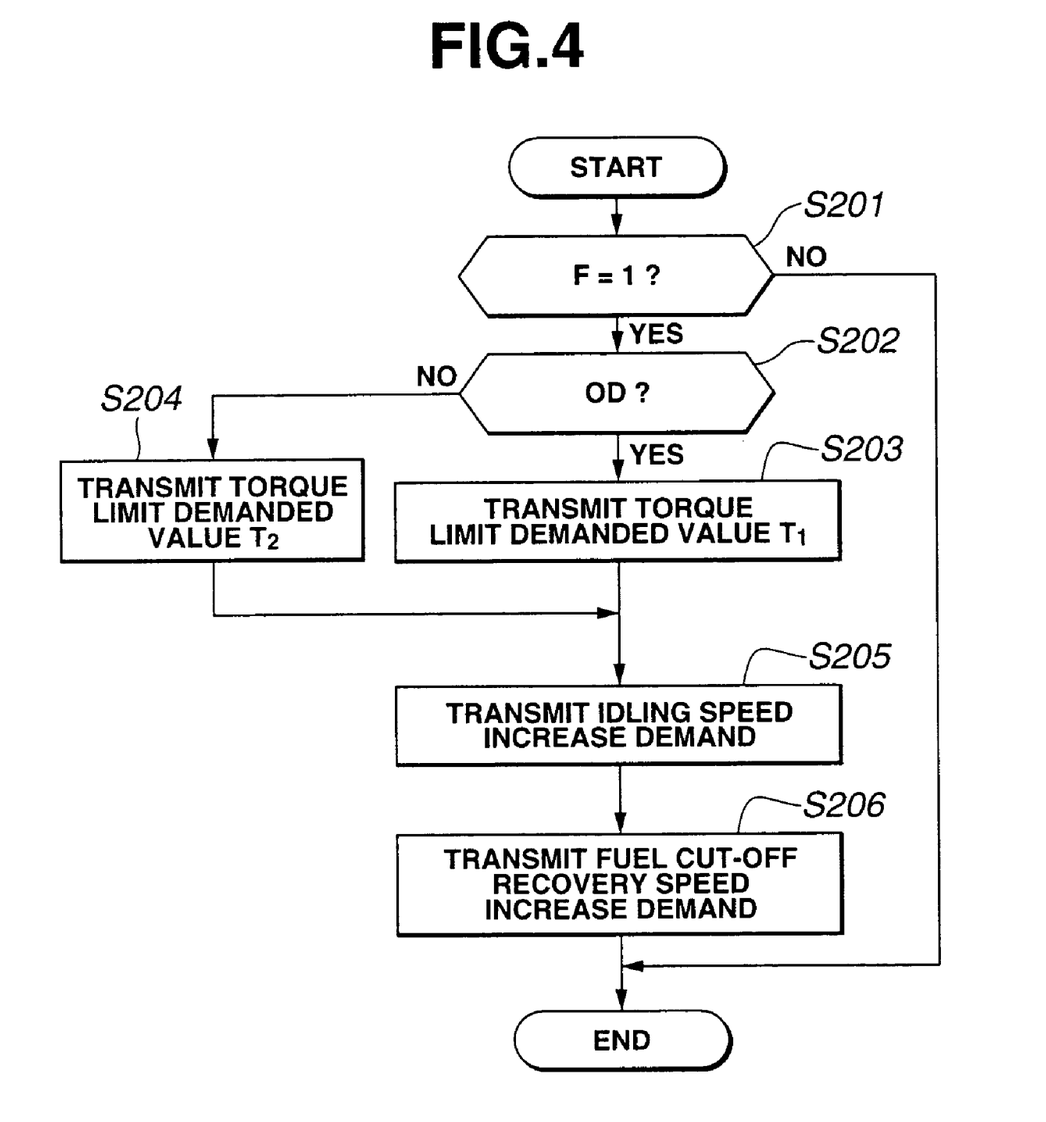
FIG. 4 is an operational flowchart representing a belt slip preventive control procedure in the first embodiment shown in FIG. 1.

FIG. 4 shows an operational flowchart representing a belt slip preventive control when the belt slip is detected. At step S201, CVT control unit 9 determines whether a belt slip flag F is set to "1". If set to "1"(F=1) (Yes) at step S201, the routine goes to a step S202. If F=0, the routine in FIG. 4 is ended. At step S202, CVT control unit 9 determines if CVT falls in an over-drive mode (OD, namely, the shift ratio control is small). If OD (Yes) at step S202, the routine goes to a step S203. If not (No), the routine goes to a step S204. At step S203, CVT control unit 9 transmits a torque limitation demand value T1 to ECU 19. At step S204, CVT control unit 9 transmits a torque limitation demand value T2 ECU 19. At step S205, the idling speed increase demand is transmitted. It is noted that T1>T2. That is to say, since, when the gear ratio is small, no deceleration is carried out (or a speed increase side), a torque applied to the secondary pulley is small and even if an upper limit of the input torque is made higher, the belt is not easy to be slipped. While securing a smooth running ability, the belt slip can be prevented. On the other hand, when the gear (shift) ratio is large, the deceleration occurs. The torque applied to the secondary pulley becomes large. If torque limitation demand value T2 is set to be low due to the large torque applied to the secondary pulley, the torque limitation deman value T2 is set to be low to prevent the recurrence of the slip. Then, at a step S206, CVT control unit 9 transmits to ECU 19 a fuel cut-off recovery speed increase demand signal which indicates a resumption of fuel injection when the engine speed is decreased by a predetermined speed. That is to say, if the engine idling speed is increased, there is a possibility that the fuel injection is resumed at an engine speed lower than the idling speed. Hence, an engine stability may occur. For example, in a case where, during the normal operation the idling speed is 550 rpm and the fuel cut-off recovery engine speed is 1200 rpm, the idling speed is increased to 750 rpm. In this case, fuel cut-off recovery speed is also increased from 1200 rpm to 1350 rpm.

(Second Embodiment)

Figure 5:
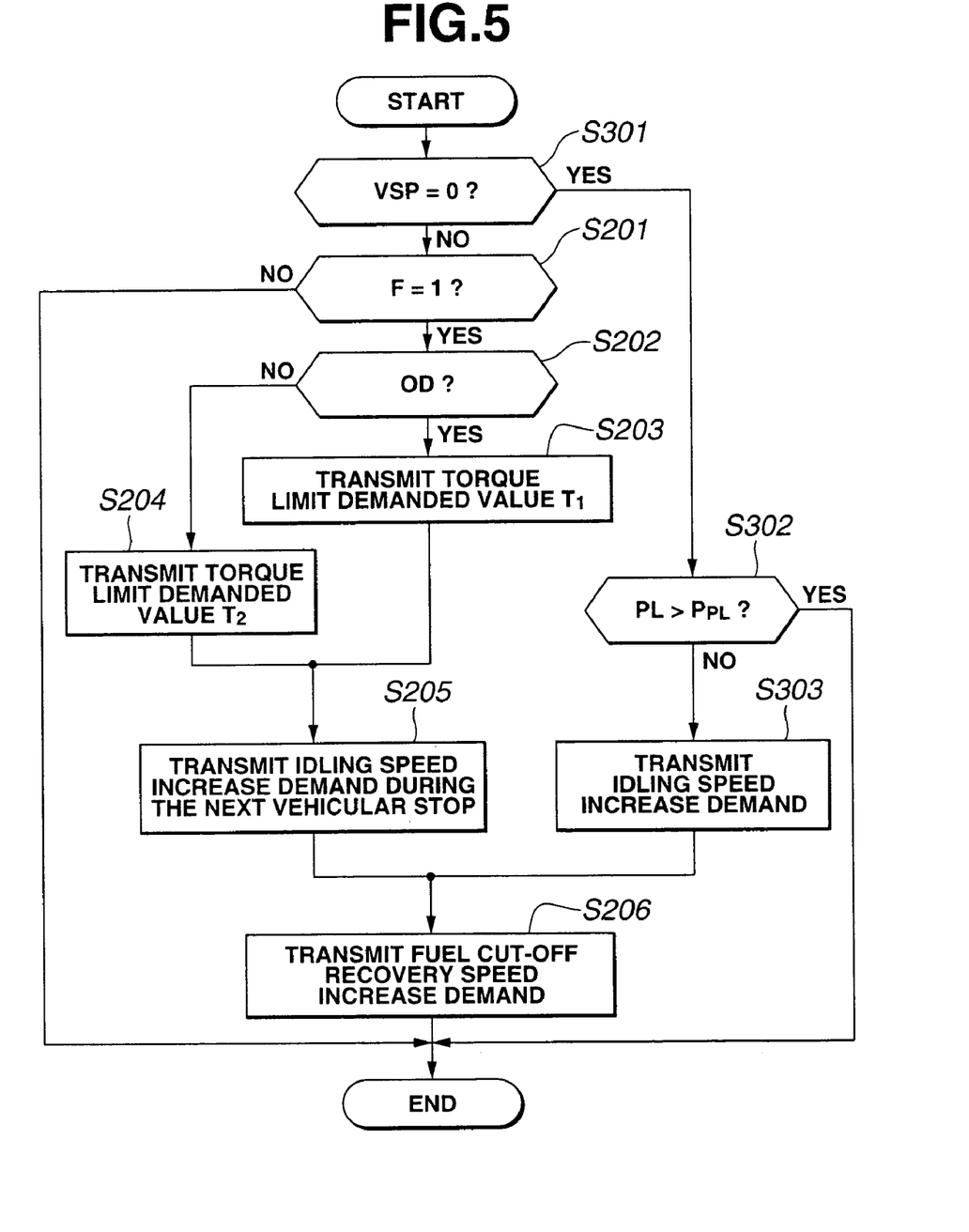
FIG. 5 is an operational flowchart representing a belt slip detection and preventive control procedure in a second preferred embodiment of the control apparatus according to the present invention.

Next, a second preferred embodiment of the control apparatus will be described. A basic structure of the second embodiment is generally the same as described in the first embodiment. Hence, only a difference point will be described below. FIG. 5 shows an operational flowchart representing a belt slip preventive control when the belt slip is detected. Since steps S201 through S206 are the same as described in the first embodiment, different steps will be explained below. That is to say, at a step S301, CVT control unit 9 determines whether the velocity of the vehicle in which the control apparatus according to the present invention is mounted (VSP) is zero. If the vehicle is stopped (VSP=0), the routine goes to a step S302. If VSP≠0 at step S301 (No), the routine goes to step S201. The contents of step S201 has been described. At step S302, CVT control unit 9 determines whether a line pressure $P_L$ is larger than a predetermined line pressure $P_{PL}$. If $P_L > P_{PL}$ (Yes) at step S302, the routine is ended. If $P_L \leq P_{PL}$ (No) at step S302, CVT control unit 9 transmits an idle speed increase demand ECU 31 to increase the present engine idle speed. That is to say, if line pressure PL during the vehicle stop is smaller than predetermined line pressure $P_{PL}$, there is a possibility of the belt slip. Immediately, the idle speed is raised. It is possible to secure the line pressure. Then, the belt slip during the vehicular stop can be prevented.

(Third Embodiment)

Figure 6:
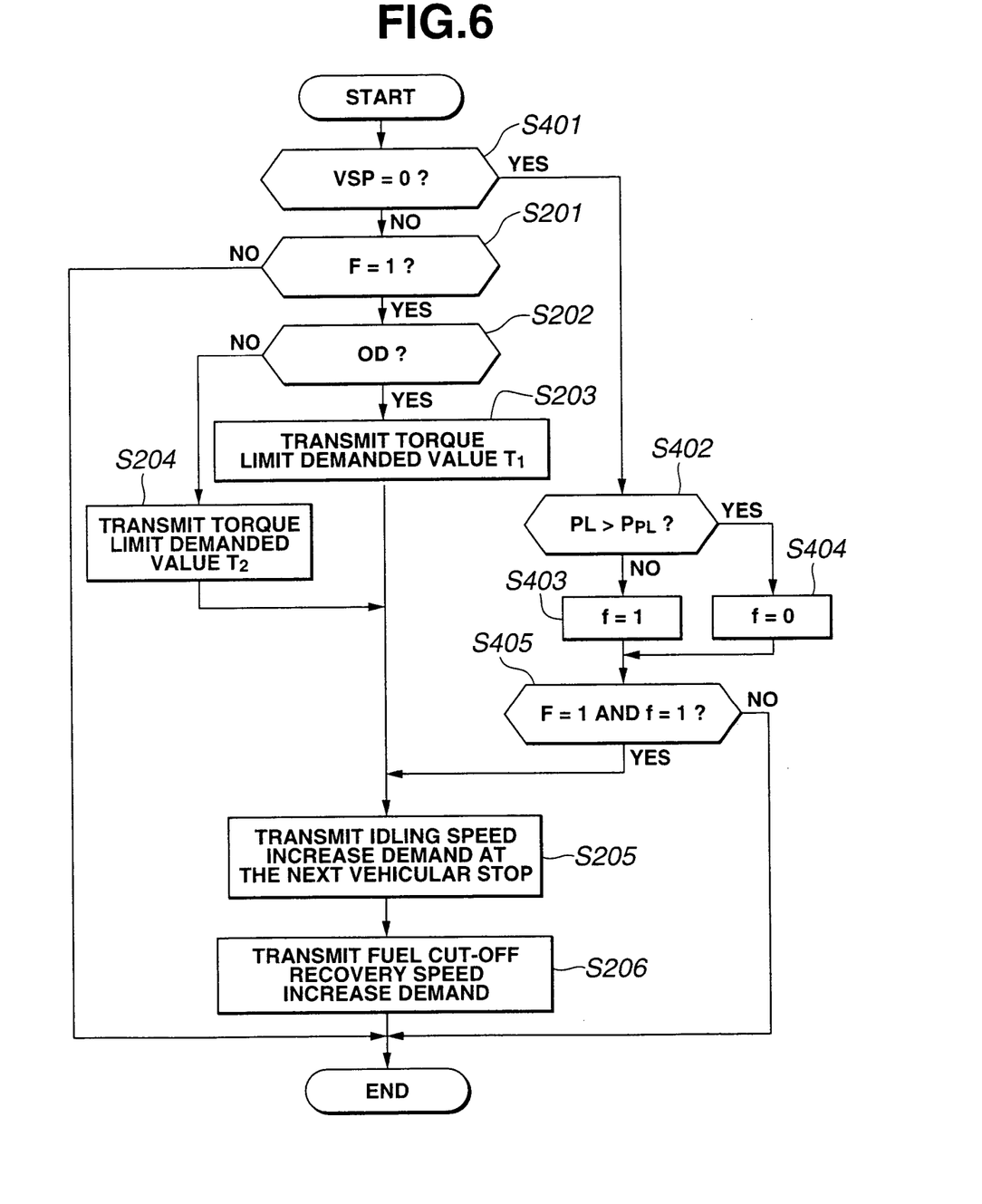
FIG. 6 is an operational flowchart representing a belt slip preventive procedure in a third preferred embodiment of the control apparatus in a third preferred embodiment according to the present invention.

Next, a third preferred embodiment of the control apparatus according to the present invention will be described. The basic structure of the third embodiment is generally the same or described in the first embodiment. Hence, the difference points will be described below. FIG. 6 shows an operational flowchart representing the belt slip preventive control when the belt slip is detected. Steps S201 through S206 are generally the same as those described in the first embodiment. The difference points will only be described below. At step S401, CVT control unit 9 determines if the vehicle speed VSP, viz., the vehicle is stopped.

At a step S402, CVT control unit 9 determines if line pressure PL is larger than a predetermined line pressure $P_{PL}$. If PL>$P_{PL}$ (Yes) at step S402, the routine goes to a step S403. At step S403, a line pressure decrease flag f is set to "0". At step S404, line pressure decrease flag f is set to "1". At a step S405, CVT control unit 9 determines whether a belt slip decrease flag F=1 and line pressure decrease flag f=1. If F=1 and f=1 (Yes) at step S405, the routine goes to a step S205. If F≠1 or f≠1 (No) at step S405, the routine is ended. That is to say, if the line pressure at the idling speed during the vehicular stop is equal to or smaller than the predetermined line pressure and the belt slip is determined to occur under a state in which the torque during the vehicular start is largely applied, the idling speed at the next vehicular stop is increased. Hence, it is not necessary to increase the idle speed with no belt slip. While preventing the belt slip, the fuel consumption can be improved.

The contents of a Japanese Patent Application No. 2002-280749 (filed in Japan on Sep. 26, 2002) are herein incorporated by reference. Various changes and modifications may be made without departing from the sprit and scope of the present invention which is to be defined in the appended claims.

What is claimed is:

1. A control apparatus for an automotive vehicle, comprising:
    a continuously variable transmission associated with a vehicular engine, including a belt that transmits a revolution of a primary pulley to a secondary pulley, and that is enabled to make a gear shift by modifying a pulley ratio between the primary and secondary pulleys with a hydraulic;
    a belt slip determining section that determines, when the vehicle is moving, if a slip of the belt between at least one of the primary and the secondary pulleys and the belt occurs; and
    an output section that outputs a signal to command an engine control unit to increase an engine idling speed by a predetermined engine speed when the vehicle stops moving, wherein the output section outputs the signal when the belt slip determining section determines that the slip therebetween occurs.

2. A control apparatus for an automotive vehicle as claimed in claim 1, wherein the vehicle further comprises:
    an oil pump to be driven by means of the engine;
    an original hydraulic supplying section that supplies an original hydraulic for a control hydraulic that controls the pulley ratio with the oil pump as a hydraulic source;
    a gear shift actuator that supplies the control hydraulic to each pulley;
    a gear shift controlling section that outputs a control command to the gear shift actuator; and
    an original hydraulic determining section that determines whether a pressure of the original hydraulic of the original pressure supplying section is equal to or below a predetermined hydraulic pressure value;
    wherein the gear shift controlling section outputs the control command to command the engine control unit to increase the engine idling speed by the predetermined engine speed when the original pressure during the vehicle stop is determined to be equal to or below the predetermined hydraulic pressure value by the original hydraulic determining section.

3. A control apparatus for an automotive vehicle as claimed in claim 2, wherein the gear shift controlling section outputs a signal indicating a demand on an output torque upper limit value to the engine control unit when outputting the signal to command the engine control unit to increase the engine idling speed by the predetermined engine speed.

4. A control method for an automotive vehicle, the vehicle comprising: a continuously variable transmission associated with an engine and including a belt that transmits a revolution of a primary pulley to a secondary pulley that is enabled to make a gear shift by modifying a pulley ratio between the primary and secondary pulleys with a hydraulic, and the method comprising the steps of:
    ascertaining whether the vehicle is moving; and
    if the vehicle is moving:
        (a) determining if a belt slip between at least one of the primary and the secondary pulleys and the belt occurs; and
        (b) if belt slip occurs, outputting a signal to command an engine control unit to increase an engine idling speed by a predetermined engine speed when the vehicle stops moving.

5. A control apparatus for an automotive vehicle comprising:

a continuously variable transmission associated with a vehicular engine, including a belt that transmits a revolution of a primary pulley to a secondary pulley, and that is enabled to make a gear shift by modifying a pulley ratio between the primary and secondary pulleys with a hydraulic;

a belt slip determining section that determines if a slip of the belt between at least one of the primary and the secondary pulleys occurs; and an output section that outputs a signal to command an engine control unit to increase an engine speed by a predetermined engine speed when the belt slip determining section determines that the slip therebetween occurs, wherein the belt slip determining section comprises:

an engine speed determining section that determines whether the engine speed Ne is larger than a first predetermined engine speed Ne1;

a secondary pulley cylinder hydraulic determining section that determines if a difference (P*sec−P1) between a target secondary pulley hydraulic P*sec and a first set hydraulic $P_1$ is larger than a second set hydraulic $P_0$ when the engine speed Ne is higher than the first predetermined engine speed Ne 1;

a setting value setting section that sets a setting value Pmin to determine if a deviation between the target cylinder secondary hydraulic P*sec and actual secondary pulley hydraulic Psec is too large;

a first secondary pulley hydraulic determining section that determines whether a difference (P*sec−Psec) between the target secondary pulley hydraulic P*sec and actual secondary pulley hydraulic Psec is larger than the setting value Pmin;

a second secondary pulley hydraulic determining section that determines whether the second secondary pulley hydraulic is smaller than a first set hydraulic (P1) when the difference between the target secondary pulley hydraulic P*sec−Psec is larger than the setting value Pmin; and a pulley ratio determining section that determines whether a ratio of revolution speeds between the primary pulley and secondary pulley is larger than a predetermined gear ratio G0 when Psec is smaller than first set hydraulic P1, and wherein the belt slip determining section determines that the belt slip occurs when the ratio of the revolution speed is larger than the predetermined gear ratio.

6. A control apparatus for an automotive vehicle as claimed in claim 5, wherein the output section comprises an overdrive determining section that determines whether an overdrive ratio occurs and the output section outputs different values of torque limitation demand values $T_1$ and $T_2$ depending on whether the overdrive ratio occurs.

7. A control apparatus for an automotive vehicle as claimed in claim 6, wherein the output section outputs one of the torque limitation demand values $T_1$ and $T_2$ in which $T_1 > T_2$ depending on whether the overdrive occurs.

8. A control apparatus for an automotive vehicle as claimed in claim 7, wherein after the output section outputs the engine speed increase demand signal to the engine control unit and, then, outputs a fuel cut-off recovery engine speed increase signal to the engine control unit and, when, during the deceleration, the engine speed is increased.

9. A control apparatus for an automotive vehicle as claimed in claim 8, wherein the belt slip determining section determines whether the vehicle is stopped and determines whether a line pressure is larger than a predetermined line pressure when the vehicle is determined to be stopped to determine whether the belt slip occurs.

10. A control apparatus for an automotive vehicle, comprising:

an engine control unit;

an oil pump, which serves as a hydraulic source, driven by an engine;

a continuously variable transmission associated with the vehicular engine, the continuously variable transmission comprising:
  a primary pulley;
  a secondary pulley; and
  a belt that transmits a revolution of the primary pulley to the secondary pulley, wherein the belt is enabled to make a gear shift by modifying a pulley ratio between the primary and secondary pulleys with the hydraulic;

a hydraulic supplying section that supplies an original hydraulic and a control hydraulic to the primary and secondary pulleys to control the pulley ratio;

an original hydraulic detecting section that detects a hydraulic pressure of the original hydraulic;

a hydraulic pressure determining section that is configured to determine whether a pressure of the original hydraulic of the hydraulic supplying section is equal to or below a predetermined hydraulic pressure when an engine idling is carried out during a vehicular stop on the basis of the hydraulic pressure of the original hydraulic detected by the original hydraulic detecting section; and an output section that outputs a signal to command the engine control unit to increase the engine idling speed by a predetermined engine speed.

* * * * *